Patented Oct. 20, 1942

2,299,170

UNITED STATES PATENT OFFICE 2,299,170

PROCESS OF MAKING COMPOSITE PIGMENTS

Kenneth S. Mowlds, Baltimore, Md., assignor to The Glidden Company, Cleveland, Ohio, a corporation of Ohio No Drawing. Application August 2, 1940, Serial No. 350,059

18 Claims. (Cl. 106—294)

The present invention relates to the production of composite pigments and has particular reference to the manufacture of lithopone.

Among the objects of this invention is the provision of a process for making composite pigment of high, improved tinting strength.

A further object of this invention is the provision of a process for making composite pigment wherein the reaction between the salts of which the pigment is formed is carried out under conditions which yield a pigment of high, improved tinting strength.

More specifically, it is an object of this invention to provide a process for producing lithopone of high, improved tinting strength.

Other, further and more specific objects of this invention will become readily apparent to persons skilled in the art from a consideration of the following description:

The use of barium sulfate as an extender for composite pigments is well known. In lithopone, zinc sulfide is extended with barious sulfate and the use of barium sulfate as an extender for titanium dioxide is also well known.

It has been found that in general certain desired objects of the present invention may be obtained by precipitating the barium sulfate from a barium sulfide solution by means of potassium sulfate. In the manufacture of lithopone, for example, if the precipitation is carried out in the presence of an excess of potassium sulfate, preferably in such a manner that the barium sulfate is precipitated by the potassium sulfate and the zinc sulfide by the liberated potassium sulfide, a lithopone of improved tinting strength is produced.

The reactions involved may be represented as follows:

(1) 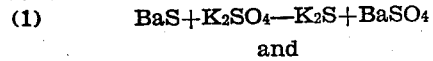

and (2) 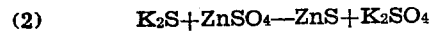

By conducting the strike under conditions which minimize the direct reaction of the barium and zinc liquors and which facilitate the precipitation of the barium sulfate with $K_2SO_4$ and the precipitation of the zinc sulfide with $K_2S$ the desired results are obtained.

One manner in which these conditions may be obtained is to add the barium and zinc liquors to the strike tank at as widely separated points as possible and to employ a mild agitation sufficient to transfer the $K_2S$ liberated by Equation 1 to the point of introduction of the zinc liquor and to transfer the $K_2SO_4$ liberated by Equation 2 to the point of introduction of the barium liquor, without sufficient agitation, however, to bring about substantial precipitation by direct reaction of the barium sulfide and zinc sulfate. Other modes of effecting precipitation of the $BaSO_4$ and ZnS by the $K_2SO_4$ and $K_2S$ present, while minimizing direct reaction between the barium and zinc liquors, may also be employed.

The $K_2SO_4$ may be added to either the barium liquor, the zinc liquor, or to water added with the zinc and barium liquors in the strike tank. The progress of the reactions taking place when the $K_2SO_4$ is added to the barium liquor is as follows: The strike is preferably started in a tank containing some water and the two solutions introduced at widely separated points. Upon addition of the $K_2SO_4$ to the barium liquor some $BaSO_4$ is precipitated with the formation of $K_2S$, so that the barium liquor in the strike tank contains BaS, $K_2S$ and $BaSO_4$. Mild agitation is employed and, when the $K_2S$ is transferred to the point of introduction of the zinc liquor, zinc sulfide is precipitated and $K_2SO_4$ formed. Of course, some co-precipitation of barium sulfate and zinc sulfide will take place when the strike is first started, but this can be minimized by the presence of some $K_2SO_4$ and/or $K_2S$ in the water used to start the strike. However, as the strike proceeds an excess of $K_2SO_4$ is formed and the direct reaction between barium and zinc liquors substantially or completely prevented. The $K_2SO_4$ liberated by the reaction at the point of introduction of the zinc liquor is transferred back to the point at which the barium liquor is introduced, resulting in the precipitation of $BaSO_4$ and the reformation of $K_2S$.

Soon after the strike is started the concentration of $K_2SO_4$ and $K_2S$ in the solution is such that the separate precipitation of the $BaSO_4$ and ZnS can be effected without any direct reaction between the barium and zinc liquors.

Example 1

To a liquor containing 225 grams BaS per liter are added 20 grams of $K_2SO_4$ per liter. The resulting liquor containing BaS, $K_2S$ and some $BaSO_4$ is run into a strike tank, preferably at the top on one side, and zinc sulfate liquor containing 175 grams $ZnSO_4$ per liter is run in preferably at the bottom on the other side of the strike tank, the relative rates of introduction of these liquors into the strike tank being regulated to produce a normal lithopone. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a manner conventional in the art. The calcined lithopone has a tinting strength of 125–150, as compared to a tinting strength of 100–103 for normal lithopone prepared by the prior art method of direct co-precipitation of the barium and zinc liquors. Prior to calcination the tinting strength of the lithopone was somewhat lower than that of the prior art uncalcined lithopone.

It is believed that the $BaSO_4$ prepared according to the present invention results in a better extending of the pigment. However, the invention is not restricted by any theory advanced.

In the manufacture of lithopone according to the method described the amount of the improvement in tinting strength is dependent somewhat upon the degree to which direct co-precipitation of the barium and zinc liquors is retarded or prevented. For some purposes it is not, however, necessary to absolutely prevent direct co-precipitation as considerably improved results can be obtained even when there is an appreciable amount of direct reaction between the two liquors. However, best results are obtained if direct reaction is substantially retarded or prevented. Lithopone having a tinting strength of at least 20—30% in excess of the tinting strength of the corresponding extended pigment produced by direct reaction between barium sulfide and zinc sulfate, that is, with a tinting strength of 125—150 on the basis above referred to is readily obtainable, and tints as high as 150 to 155 or higher have been obtained. For best results it is preferred to add the liquors to the strike tank at as widely separated points as possible, and to employ only mild agitation. Under such conditions with an excess of $K_2SO_4$ present, there will be substantially no direct co-precipitation and the optimum results of the present invention will be obtained.

*Example II*

To a $ZnSO_4$ liquor containing 175 grams $ZnSO_4$ per liter are added 30 grams of $K_2SO_4$ per liter. The resulting liquor containing $ZnSO_4$ and $K_2SO_4$ is run into a strike tank, preferably at the bottom on one side and a barium sulfide liquor containing 225 grams BaS per liter is run in preferably at the top on the opposite side of the strike tank, the relative rates of introduction of these liquors into the strike tank being regulated to produce a normal lithopone. Water is added to maintain the strike at approximately 9° Baumé. The strike is made at about 75° C. Mild agitation is employed so that as the strike proceeds the $K_2SO_4$ and the $K_2S$ that is generated are transferred to the points at which the respective liquors are added, but the agitation is insufficient to transfer the zinc or barium liquors to cause direct substantial co-precipitation of the barium and zinc liquors. After the strike is complete, the lithopone is filtered, washed to remove soluble salts, ground and calcined in a manner conventional in the art.

*Example III*

To a barium sulfide liquor containing 225 grams BaS per liter is added 20 grams $K_2SO_4$ per liter. To a $ZnSO_4$ liquor containing 175 grams $ZnSO_4$ per liter are added 30 grams of $K_2SO_4$ per liter. The first resulting liquor containing BaS, $K_2S$ and some $BaSO_4$ is then added to the resulting second liquor containing $ZnSO_4$ and $K_2SO_4$. These liquors are introduced into a strike tank, the zinc liquor preferably at the bottom of one side and the barium liquor preferably at the top on the other side. These liquors are fed into the strike tank at relative rates to produce a normal lithopone. Water is added to maintain the strike at approximately 9° Baumé, the strike being made at 75° C. Mild agitation is employed so that as the strike proceeds the $K_2SO_4$ and $K_2S$ are transferred to the points at which the respective liquors are added, but the agitation is insufficient to transfer the zinc or barium liquors to cause direct substantial co-precipitation of the barium and zinc liquors. After the strike is complete, the lithopone is filtered, washed to remove soluble salts, ground and calcined in a manner conventional in the art.

*Example IV*

Barium sulfide liquor containing 225 grams BaS per liter is struck simultaneously with the $ZnSO_4$ liquor containing 175 grams $ZnSO_4$ per liter and a solution of $K_2SO_4$ is also simultaneously added in a sufficient quantity and at sufficient rate to maintain 10 grams per liter $K_2SO_4$ in the resulting strike liquor from the beginning to the end of the run, during which time the volume of strike liquor is increased. The BaS liquor and the $ZnSO_4$ liquor are fed into the strike tank at relative rates to produce a normal lithopone. The $ZnSO_4$ solution is preferably fed into the bottom of the strike tank on one side and the barium liquor preferably at the top of the opposite side. The $K_2SO_4$ liquor is preferably fed in at the top. Water is added to maintain the strike at approximately 9° Baumé, the strike being made at 75° C. Mild agitation is employed so that as the strike proceeds the $K_2SO_4$ and $K_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a manner conventional in the art.

*Example V*

Barium sulfide liquor containing 225 grams BaS per liter is struck simultaneously with the $ZnSO_4$ liquor containing 175 grams $ZnSO_4$ per liter and a solution of $K_2S$ is also simultaneously added in a sufficient quantity and at sufficient rate to maintain 6 grams $K_2S$ per liter in the resulting strike liquor from the beginning to the end of the run, during which time the volume of strike liquor is increased. The BaS liquor and the $ZnSO_4$ liquor are fed into the strike tank at relative rates to produce a normal lithopone. The $ZnSO_4$ solution is preferably fed into the bottom of the strike tank on one side and the barium liquor preferably at the top on the opposite side. The $K_2S$ liquor is preferably fed in at the top. Water is added to maintain the strike at approximately 9° Baumé, the strike being made at 75° C. Mild agitation is employed so that as the strike proceeds the $K_2SO_4$ and $K_2S$ are transferred to the points at which the respective liquors are added, but the agitation is insufficient to transfer the zinc or barium liquors to cause direct substantial co-precipitation of the barium and zinc liquors. After the strike is complete, the lithopone is filtered, washed to remove soluble salts, ground and calcined in a manner conventional in the art.

Example VI

To a barium sulfide liquor containing 225 grams BaS per liter is added 12 grams $K_2S$ per liter. The resulting liquor containing BaS and $K_2S$ is run into a strike tank, preferably at the top on one side and a $ZnSO_4$ liquor containing 175 grams $ZnSO_4$ per liter is run in, preferably at the bottom on the other side of the strike tank, the relative rates of introduction of these liquors into the strike tank being regulated to produce normal lithopone at the finish of the strike. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a manner conventional in the art.

Example VII

To a barium sulfide liquor containing 225 grams BaS per liter is added 12 grams $K_2S$ per liter. The resulting liquor containing BaS and $K_2S$ is run into a strike tank, preferably at the top on one side, and a $ZnSO_4$ liquor containing 175 grams $ZnSO_4$ per liter is run in, preferably at the bottom on the other side of the strike tank. The rate of introduction of the $ZnSO_4$ liquor is regulated to produce a lithopone that is lower in ZnS content than normal lithopone. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer the zinc or barium liquors to cause direct substantial co-precipitation of the barium and zinc liquors. After the strike is complete, the lithopone is filtered, washed to remove soluble salts, ground and calcined in a manner conventional in the art.

Example VIII

To a $ZnSO_4$ solution containing 175 grams $ZnSO_4$ per liter is added 12 grams of $K_2S$ per liter. The resulting liquor containing $ZnSO_4$, ZnS and $K_2SO_4$ is run into a strike tank, preferably at the bottom on one side, and a barium sulfide solution containing 225 grams BaS per liter is added, preferably at the top on the opposite side, the relative rates of introduction of these liquors into the strike tank being regulated to produce a normal lithopone. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer the zinc or barium liquors to cause direct substantial co-precipitation of the barium and zinc liquors. After the strike is complete, the lithopone is filtered, washed to remove soluble salts, ground and calcined in a manner conventional in the art.

Example IX

To a liquor containing 225 grams BaS per liter are added 20 grams of $Na_2SO_4$ per liter. The resulting liquor containing BaS, $Na_2S$ and some $BaSO_4$ is run into a strike tank, preferably at the top on one side, and zinc sulfate liquor containing 175 grams $ZnSO_4$ per liter is run in preferably at the bottom on the other side of the strike tank, the relative rates of introduction of these liquors into the strike tank being regulated to produce a normal lithopone. Water is added to maintain the strike at approximately 9° Baumé, the strike being made at about 75° C. Mild agitation is employed so that as the strike proceeds the $Na_2SO_4$ and $Na_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a matter conventional in the art.

Example X

To a liquor containing 225 grams BaS per liter are added 15 grams of $Li_2SO_4$ per liter. The resulting liquor containing BaS, $Li_2S$ and some $BaSO_4$ is run into a strike tank, preferably at the top on one side, and zinc sulfate liquor containing 175 grams $ZnSO_4$ per liter is run in preferably at the bottom on the other side of the strike tank, the relative rates of introduction of these liquors into the strike tank being regulated to produce a normal lithopone. Water is added to maintain the strike at approximately 9° Baumé, the strike being made at about 75° C. Mild agitation is employed so that as the strike proceeds the $Li_2SO_4$ and $Li_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a manner conventional in the art.

Example XI

To a liquor containing 225 grams BaS per liter are added 20 grams of $K_2SO_4$ per liter. The resulting liquor containing BaS, $K_2S$ and some $BaSO_4$ is run into a strike tank, preferably at the top on one side, and cadmium sulfate liquor containing 220 grams $CdSO_4$ per liter is run in preferably at the bottom on the other side of the strike tank, the relative rates of introduction of these liquors into the strike tank being regulated to produce a normal cadmium lithopone. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer cadmium or barium liquors to cause direct substantial co-precipitation of the barium and cadmium liquors. After the strike is complete, the lithopone is filtered, washed to remove soluble salts, ground and calcined in a manner conventional in the art.

Example XII

To a liquor containing 225 grams BaS per liter are added 20 grams of $K_2SO_4$ per liter. The resulting liquor containing BaS, $K_2S$ and some $BaSO_4$ is run into a strike tank, preferably at the top on one side, and another liquor containing 175 grams CdSO₄ per liter and 35 grams ZnSO₄ per liter is run in preferably at the bottom on the other side of the strike tank, the relative rates of introduction of these liquors into the strike tank being regulated to produce the desired light tint and cadmium-zinc content lithopone. Water is added to maintain the strike at approximately 9° Baumé, the strike being made at about 75° C. Mild agitation is employed so that as the strike proceeds the K₂SO₄ and K₂S are transferred to the points at which the respective liquors are added, but the agitation is insufficient to transfer the cadmium-zinc or barium liquors to cause direct substantial co-precipitation of the barium and cadmium-zinc liquors. After the strike is complete, the lithopone is filtered, washed to remove soluble salts, ground and calcined in a manner conventional in the art.

*Example XIII*

To a liquor containing 225 grams BaS per liter and 35 grams selenium per liter are added 20 grams of K₂SO₄ per liter. The resulting liquor containing BaS.Se$_x$, K₂S'Se$_x$ and some BaSO₄ is run into a strike tank, preferably at the top on one side, and CdSO₄ liquor containing 220 grams CdSO₄ per liter is run in preferably at the bottom on the other side of the strike tank, the relative rates of introduction of these liquors into the strike tank being regulated to produce the desired red tint and cadmium-selenium content lithopone. Water is added to maintain the strike at approximately 9° Baumé, the strike being made at about 75° C. Mild agitation is employed so that as the strike proceeds the K₂SO₄ and K₂S.Se$_x$ are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

*Example XIV*

To a barium sulfide liquor containing 225 grams BaS per liter is added a solution containing 12 grams K₂S per liter and 40 grams selenium per liter. The resulting liquor containing BaS.Se$_x$, K₂S.Se$_x$ and K₂S is run into a strike tank, preferably at the top on one side, and a CdSO₄ liquor containing 220 grams CdSO₄ per liter is run in, preferably at the bottom on the other side of the strike tank, the relative rates of introduction of these liquors into the strike tank being regulated to produce at the finish of the strike lithopone of the desired red tint and cadmium-selenium content. Water is added to maintain the strike at approximately 9° Baumé, the strike being made at about 75° C. Mild agitation is employed so that as the strike proceeds the K₂SO₄, K₂S.Se$_x$ and K₂S are transferred to the points at which the respective liquors are added, but the agitation is insufficient to transfer the cadmium or barium liquors to cause direct substantial co-precipitation of the barium and cadmum liquors. After the strike is complete, the lithopone is filtered, washed to remove soluble salts, ground and calcined in a manner conventional in the art.

*Example XV*

To a barium sulfide liquor containing 225 grams BaS per liter and 35 grams selenium per liter is added 12 grams K₂S per liter. The resulting liquor containing BaS.Se$_x$ and K₂S is run into a strike tank, preferably at the top on one side, and a CdSO₄ liquor containing 220 grams CdSO₄ per liter is run in, preferably at the bottom on the other side of the strike tank. The rate of introduction of the CdSO₄ liquor is regulated to produce a lithopone wherein the cadmium-selenium content is lower than the stoichiometric equivalent of BaSO₄ thereof. Water is added to maintain the strike at approximately 9° Baumé, the strike being made at about 75° C. Mild agitation is employed so that as the strike proceeds the K₂SO₄, K₂S.Se$_x$ and K₂S are transferred to the points at which the respective liquors are added, but the agitation is insufficient to transfer cadmium or barium liquors to cause direct substantial co-precipitation of the barium and cadmium liquors. After the strike is complete, the lithopone is filtered, washed to remove soluble salts, ground and calcined in a manner conventional in the art.

*Example XVI*

Barium sulfide liquor containing 225 grams BaS per liter is struck simultaneously with the CdSO₄ liquor containing 220 grams CdSO₄ per liter and a solution of K₂SO₄ is also simultaneously added in a sufficient quantity and at sufficient rate to maintain 10 grams per liter K₂SO₄ in the resulting strike liquor from the beginning to the end of the run, during which time the volume of strike liquor is increased. The BaS liquor and the CdSO₄ liquor are fed into the strike tank at relative rates to produce a normal cadmium lithopone. The CdSO₄ solution is preferably fed into the bottom of the strike tank on one side and the barium liquor preferably at the top on the opposite side. The K₂SO₄ liquor is preferably fed in at the top. Water is added to maintain the strike at approximately 9° Baumé, the strike being made at 75° C. Mild agitation is employed so that as the strike proceeds the K₂SO₄ and K₂S are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

*Example XVII*

Barium sulfide liquor containing 225 grams BaS per liter is struck simultaneously with the CdSO₄ liquor containing 220 grams CdSO₄ per liter and a solution of K₂S is also simultaneously added in a sufficient quantity and at sufficient rate to maintain 6 grams K₂S per liter in the resulting strike liquor from the beginning to the end of the run, during which time the volume of strike liquor is increased. The BaS liquor and the CdSO₄ liquor are fed into the strike tank at relative rates to produce a normal cadmium lithopone. The CdSO₄ solution is preferably fed into the bottom of the strike tank on one side and the barium liquor preferably at the top on the opposite side. The K₂S liquor is preferably fed in at the top. Water is added to maintain the strike at approximately 9° Baumé, the strike being made at 75° C. Mild agitation is employed so that as the strike proceeds the K₂SO₄ and K₂S are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

Example XVIII

Barium sulfide liquor containing 225 grams BaS per liter and 35 grams selenium per liter is struck simultaneously with the $CdSO_4$ liquor containing 220 grams $CdSO_4$ per liter and a solution of $K_2SO_4$ is also simultaneously added in a sufficient quantity and at sufficient rate to maintain 10 grams per liter $K_2SO_4$ in the resulting strike liquor from the beginning to the end of the run, during which time the volume of strike liquor is increased. The $BaS.Se_x$ liquor and the $CdSO_4$ liquor are fed into the strike tank at relative rates to produce the desired red tint and cadmium-selenium content lithopone. The $CdSO_4$ solution is preferably fed into the bottom of the strike tank on one side and the barium liquor preferably at the top on the opposite side. The $K_2SO_4$ liquor is preferably fed in at the top. Water is added to maintain the strike at approximately 9° Baumé, the strike being made at 75° C. Mild agitation is employed so that as the strike proceeds the $K_2SO_4$, $K_2S.Se_x$ and $K_2S$ are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

Example XIX

Barium sulfide liquor containing 225 grams BaS per liter and 35 grams selenium per liter is struck simultaneously with the $CdSO_4$ liquor containing 220 grams $CdSO_4$ per liter and a solution of $K_2S$ is also simultaneously added in a sufficient quantity and at sufficient rate to maintain 6 grams $K_2S$ per liter in the resulting strike liquor from the beginning to the end of the run, during which time the volume of strike liquor is increased. The $BaS.Se_x$ liquor and the $CdSO_4$ liquor are fed into the strike tank at relative rates to produce the desired red tint and cadmium-selenium content lithopone. The $CdSO_4$ solution is preferably fed into the bottom of the strike tank on one side and the barium liquor preferably at the top on the opposite side. The $K_2S$ liquor is preferably fed in at the top. Water is added to maintain the strike at approximately 9° Baumé, the strike being made at 75° C. Mild agitation is employed so that as the strike proceeds the $K_2SO_4$ and $K_2S.Se_x$ are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

Example XX

Barium sulfide liquor containing 225 grams BaS per liter and 35 grams selenium per liter is struck simultaneously with the $CdSO_4$ liquor containing 220 grams $CdSO_4$ per liter, and a solution of $K_2S.Se_x$ containing 40 grams selenium per liter is also simultaneously added in a sufficient quantity and at sufficient rate to maintain 6 grams $K_2S$ per liter in the resulting strike liquor from the beginning to the end of the run, during which time the volume of strike liquor is increased. The $BaS.Se_x$ liquor and the $CdSO_4$ liquors are fed into the strike tank at relative rates to produce the desired red tint and cadmium-selenium content lithopone. The $CdSO_4$ solution is preferably fed into the bottom of the strike tank on one side and the barium liquor preferably at the top on the opposite side. The $K_2S.Se_x$ liquor is preferably fed in at the top. Water is added to maintain the strike at approximately 9° Baumé, the strike being made at 75° C. Mild agitation is employed so that as the strike proceeds the $K_2SO_4$ and $K_2S.Se_x$ are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

In the foregoing examples, the concentration of the salts employed in the reactions are typical for operating conditions suitable for the respective processes. However, it is to be understood that solutions having different concentrations of these salts may also be employed within the scope of this invention. For example, the concentration of $K_2SO_4$ or other alkali metal sulfate employed in the strike tank may vary from 2–40 grams per liter. The $K_2S$ may also be varied from 2–40 grams per liter.

This invention may be employed for the production of normal types of lithopone wherein the ZiS, CdS and/or $CdS.Se_x$ content is substantially equal to the stoichiometric equivalent of the $BaSO_4$ thereof, as well as of lithopones wherein the ZnS, CdS and/or $CdS.Se_x$ content is either lower or higher than the stoichiometric equivalent of the $BaSO_4$ thereof. The improvement in tinting strength and covering power of the lithopones produced by this invention varies with the differences in the chemical compositions of these pigments but, irrespective of the differences in composition of the lithopones, I have found that the lithopones prepared according to the present invention show decided increase and improvement in tinting strength over lithopones of corresponding chemical composition prepared by the methods heretofore employed.

While certain theories and explanations have been advanced they are intended by way of explanation and not of restriction since various changes and modifications may be made by those skilled in the art without departing from the spirit of the invention. Other modes of minimizing the direct co-precipitation of the zinc and barium liquors and of facilitating the precipitation of the BaS liquor with $K_2SO_4$ and the $ZnSO_4$ liquor with the $K_2S$ may be employed.

In the foregoing specification and the following claims wherever liquors or solutions of BaS and $K_2S$ are mentioned, it is to be understood that these references apply to the products resulting from the solution of these sulfides in water. It is believed that when BaS is dissolved in water the product of solution consists of $Ba(OH)_2$ and $Ba(SH)_2$. It is also assumed that when $K_2S$ is dissolved in water the product of solution is KOH and KSH. In like manner, reference to liquors or solutions of $Na_2S$ and $Li_2S$ are intended to apply to the products resulting from the solution of these sulfides in water, and reference to liquors or solutions of BaS.Se$_x$ and K$_2$S.Se$_x$ are intended to apply to the products resulting from the solution of these sulfoselenides in water.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making lithopone, simultaneously introducing an aqueous solution of BaS and K$_2$SO$_4$ into a strike vessel and simultaneously introducing an aqueous solution of ZnSO$_4$ into said strike vessel at a place in the vessel separated from the place of introduction of the aqueous solution of BaS and K$_2$SO$_4$ whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, and agitating the resulting liquor.

2. In a process of making lithopone, simultaneously introducing an aqueous solution of ZnSO$_4$ and K$_2$SO$_4$ into a strike vessel and simultaneously introducing an aqueous solution of BaS into said strike vessel at a place in the vessel separated from the place of introduction of the aqueous solution of ZnSO$_4$ and K$_2$SO$_4$ whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, and agitating the resulting liquor.

3. In a process of making lithopone, simultaneously introducing an aqueous solution of BaS and K$_2$SO$_4$ into a strike vessel and simultaneously introducing an aqueous solution of ZnSO$_4$ and K$_2$SO$_4$ into said strike vessel at a place in the vessel separated from the place of introduction of the aqueous solution of BaS and K$_2$SO$_4$ whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, and agitating the resulting liquor.

4. In a process of making lithopone, simultaneously introducing an aqueous solution of BaS, an aqueous solution of ZnSO$_4$ and an aqueous solution of K$_2$SO$_4$ into a strike vessel, the ZnSO$_4$ solution being introduced into said strike vessel at a place in the vessel separated from the place of introduction of the BaS solution whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, and agitating the resulting liquor.

5. In a process of making lithopone, simultaneously introducing an aqueous solution of BaS, an aqueous solution of ZnSO$_4$ and an aqueous solution of K$_2$S into a strike vessel, the ZnSO$_4$ solution being introduced into said strike vessel at a place in the vessel separated from the place of introduction of the BaS solution whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, and agitating the resulting liquor.

6. In a process of making lithopone, introducing an aqueous solution of BaS and K$_2$S into a strike vessel and simultaneously introducing an aqueous solution of ZnSO$_4$ into said strike vessel at a place in the vessel separated from the place of introduction of the aqueous solution of BaS and K$_2$S whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, regulating the relative rates of introduction of said aqueous solutions to add the BaS and ZnSO$_4$ in stoichiometric proportion to each other, and agitating the resulting liquor.

7. In a process of making lithopone, introducing an aqueous solution of BaS and K$_2$S into a strike vessel and simultaneously introducing an aqueous solution of ZnSO$_4$ into said strike vessel at a place in the vessel separated from the place of introduction of the aqueous solution of BaS and K$_2$S whereby metathetical reaction between BaS and the K$_2$SO$_4$ regenerated to the process and between ZnSO$_4$ and the K$_2$S regenerated in the process is promoted and direct reaction between the BaS and ZnSO$_4$ is minimized, regulating the relative rates of introduction of said aqueous solutions to add the ZnSO$_4$ in less than stoichiometric proportion to the BaSO$_4$ being added, and agitating the resulting liquor.

8. In a process of making lithopone, introducing an aqueous solution of ZnSO$_4$ and K$_2$S into a strike vessel and simultaneously introducing an aqueous solution of BaS into said strike vessel at a place in the vessel separated from the place of introduction of the aqueous solution of ZnSO$_4$ and K$_2$S whereby metathetical reaction between BaS and the K$_2$SO$_4$ regenerated in the process and between ZnSO$_4$ and the K$_2$S regenerated in the process is promoted and direct reaction between the BaS and ZnSO$_4$ is minimized, and agitating the resulting liquor.

9. In a process of making cadmium lithopone, introducing an aqueous solution of BaS and K$_2$SO$_4$ into a strike vessel and simultaneously introducing an aqueous solution of CdSO$_4$ into said strike vessel at a place in the vessel separated from the place of introduction of the aqueous solution of BaS and K$_2$SO$_4$ whereby metathetical reaction between BaS and the K$_2$SO$_4$ regenerated in the process and between CdSO$_4$ and the K$_2$S regenerated in the process is promoted and direct reaction between the BaS and CdSO$_4$ is minimized, and agitating the resulting liquor.

10. In a process of making cadmium-zinc lithopone, introducing an aqueous solution of BaS and K$_2$SO$_4$ into a strike vessel and simultaneously introducing an aqueous solution of CdSO$_4$ and ZnSO$_4$ into said strike vessel at a place in the vessel separated from the place of introduction of the aqueous solution of BaS and K$_2$SO$_4$ whereby metathetical reaction between BaS and the K$_2$SO$_4$ regenerated in the process and between CdSO$_4$ and ZnSO$_4$ and the K$_2$S regenerated in the process is promoted and direct reaction between the BaS and CdSO$_4$ and ZnSO$_4$ is minimized, and agitating the resulting liquor.

11. A process of making a composite pigment of the group consisting of lithopone, cadmium lithopone and cadmium-zinc lithopone, said process comprising simultaneously introducing an aqueous solution of BaS and an aqueous solution of sulfate of other metal whose sulfide forms a component of the composite pigment into a bath of an aqueous salt solution whose cations are of the alkali metal group and the anions of which are of at least one member of the group consisting of sulfide and sulfate ions and are exclusive of other ions, and carrying out said process under conditions which promote metathetical reaction between the BaS and the sulfate of alkali metal regenerated in the process and between said sulfate of other metal and the alkali metal sulfide regenerated in the process and which minimize direct reaction between the first-named salts by introducing said first-named salts at places in the aqueous bath remote from each other.

12. The process claimed in claim 11, wherein there are introduced into the bath of aqueous salt solution stoichiometric proportions to each other of BaS and the sulfate of other metal whose sulfide forms a component of the composite pigment.

13. A process of making a composite pigment of the group consisting of lithopone, cadmium lithopone and cadmium-zinc lithopone, said process comprising simultaneously introducing an aqueous solution of BaS and an aqueous solution of sulfate of other metal whose sulfide forms a component of the composite pigment into a bath of an aqueous potassium salt solution the anions of which are of at least one member of the group consisting of sulfide and sulfate ions and are exclusive of other ions, and carrying out said process under conditions which promote metathetical reaction between the BaS and the $K_2SO_4$ regenerated in the process and between said sulfate of other metal and the $K_2S$ regenerated in the process and which minimize direct reaction between the first-named salts by introducing said first-named salts at places in the potassium salt bath remote from each other.

14. The process claimed in claim 13, wherein there are introduced into the bath of potassium salt solution stoichiometric proportions to each other of BaS and the sulfate of the other metal whose sulfide forms a component of the composite pigment.

15. A process of making lithopone, said process comprising simultaneously introducing an aqueous solution of BaS and an aqueous solution of $ZnSO_4$ into a bath of an aqueous salt solution whose cations are of the alkali metal group and the anions of which are of at least one member of the group consisting of sulfide and sulfate ions and are exclusive of other ions, and carrying out said process under conditions which promote metathetical reaction between the BaS and the sulfate of alkali metal regenerated in the process and between the $ZnSO_4$ and the alkali metal sulfide regenerated in the process and which minimize direct reaction between the BaS and $ZnSO_4$ by introducing the BaS and $ZnSO_4$ at places in the aqueous bath remote from each other.

16. The process claimed in claim 15, wherein there are introduced into the bath of aqueous salt solution stoichiometric proportions to each other of BaS and $ZnSO_4$.

17. A process of making lithopone, said process comprising simultaneously introducing an aqueous solution of BaS and an aqueous solution of $ZnSO_4$ into a bath of an aqueous potassium salt solution the anions of which are of at least one member of the group consisting of sulfide and sulfate ions and are exclusive of other ions, carrying out said process under conditions which promote metathetical reaction between the BaS and the $K_2SO_4$ regenerated in the process and between said sulfate of other metal and the $K_2S$ regenerated in the process and which minimize direct reaction between the BaS and $ZnSO_4$ by introducing the BaS and $ZnSO_4$ at places in the aqueous bath remote from each other, and calcining the precipitate of $BaSO_4$ and ZnS thus formed.

18. The process claimed in claim 17, wherein there are introduced into the bath of aqueous salt solution stoichiometric proportions to each other of BaS and $ZnSO_4$.

KENNETH S. MOWLDS.